UNITED STATES PATENT OFFICE.

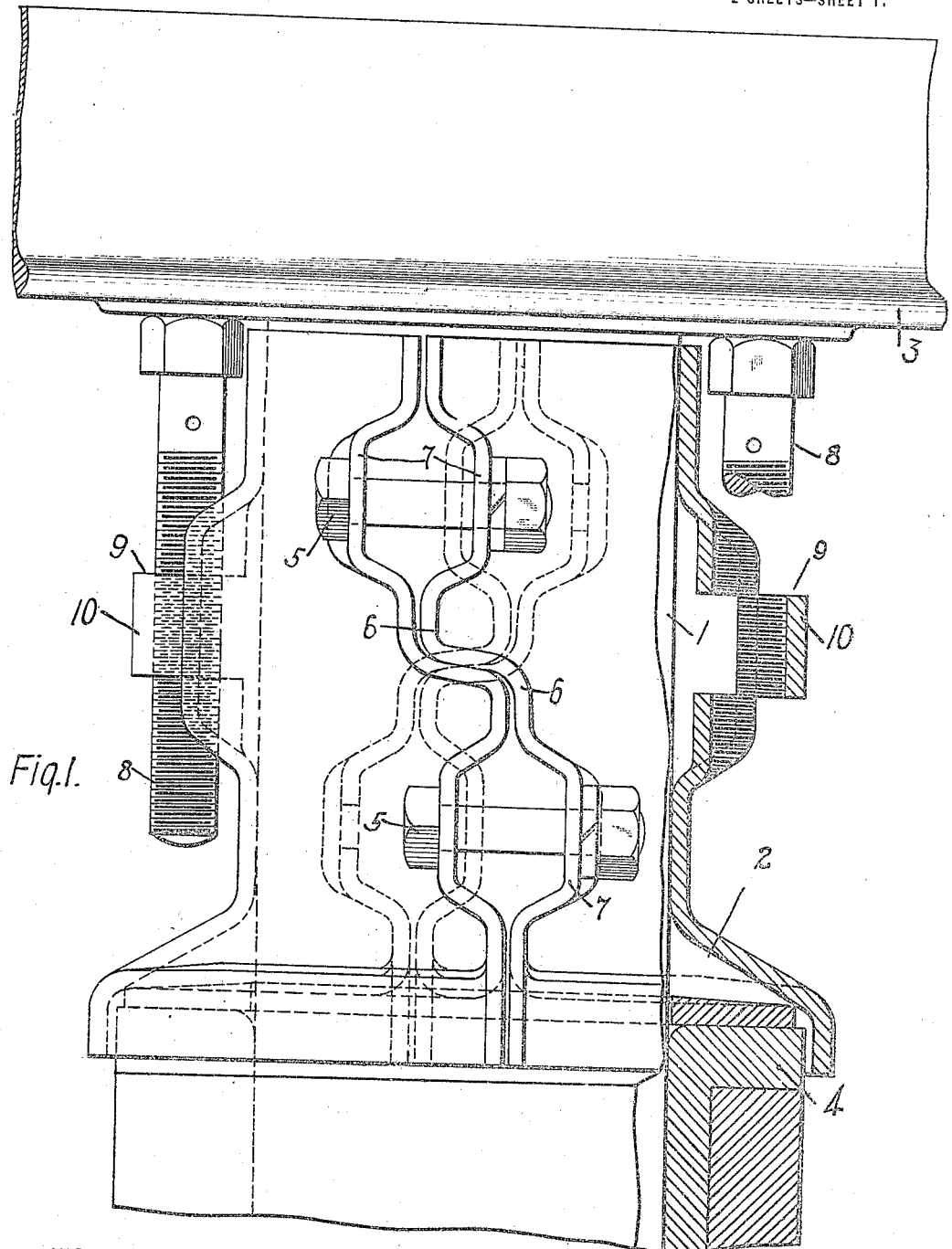

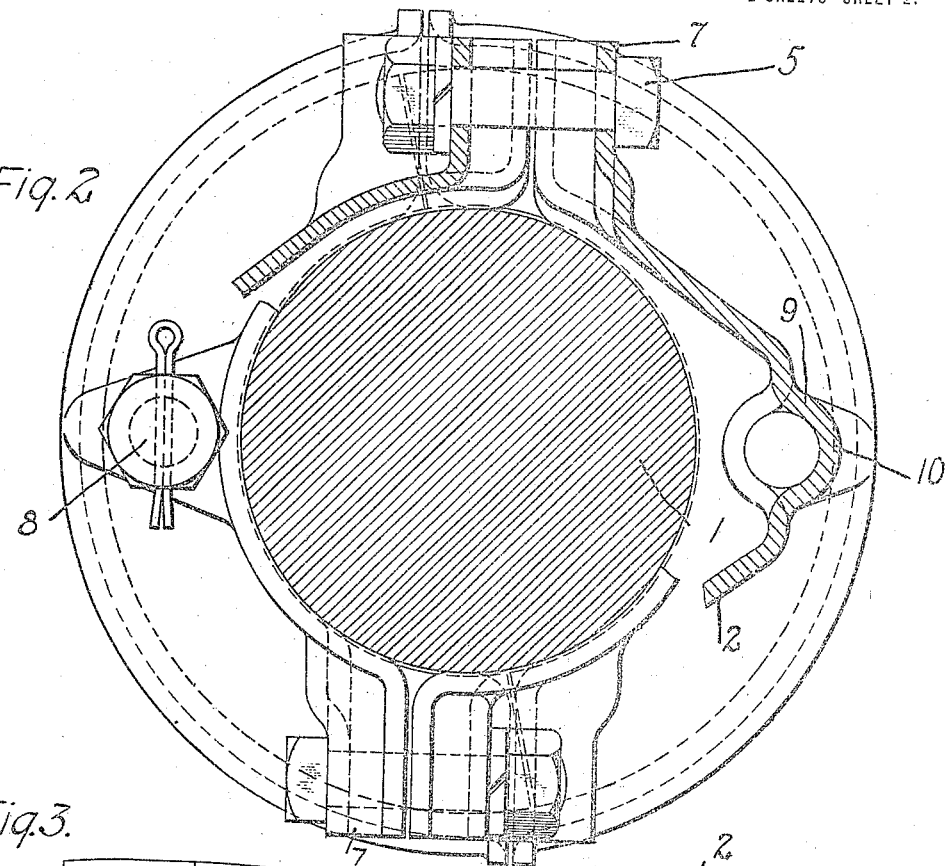
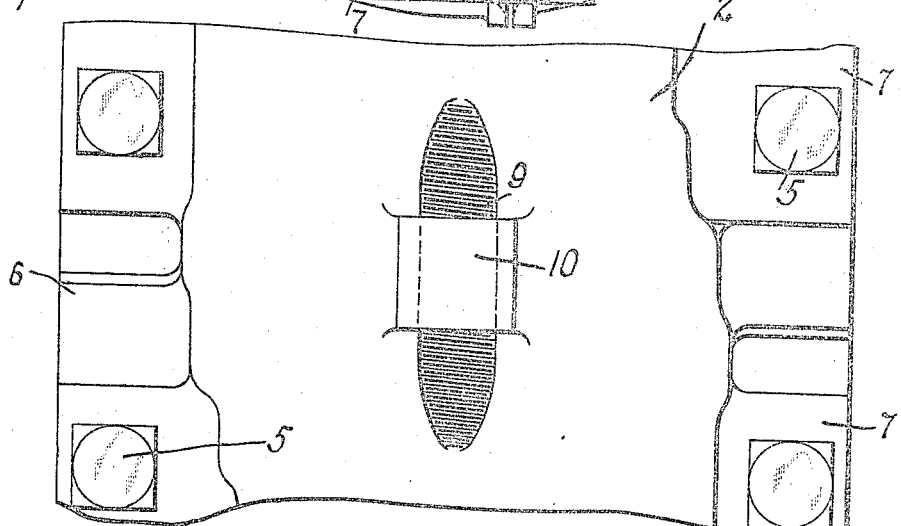

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

AXLE-COLLAR.

1,239,893.  Specification of Letters Patent.  Patented Sept. 11, 1917.

Application filed February 19, 1914. Serial No. 819,728.

*To all whom it may concern:*

Be it known that I, GEORGE M. EATON, a citizen of the United States, and a resident of Pittsburgh, in the county of Allegheny and State of Pennsylvania, have invented a new and useful Improvement in Axle-Collars, of which the following is a specification.

My invention relates to axle collars, and it has special reference to collars of the type employed on axles of electric cars or locomotive trucks for spacing the dynamo-electric machine frame, which is disposed on the axle, from the car wheels.

One object of my invention is to provide a device of the above-indicated character which shall be simple and inexpensive to manufacture, compact and durable in construction and particularly adapted to prevent relative longitudinal movement of its component members.

Another object of my invention is to provide a novel form of threaded construction, as hereinafter described.

Heretofore, in order to prevent the axle-inclosing members of a split axle collar from moving relatively, in a longitudinal direction, during the operation of the motor-driven vehicle, the said members have been made of differing construction, one member being provided with lugs and the other with corresponding recesses, thereby doubling the number of necessary patterns, spare parts, etc.

According to my invention, I provide an axle-collar comprising two duplicate members which may be readily pressed out in accordance with familiar methods. Each half member is provided, on its respective sides, with staggered extruded portions or lugs, and the two members are oppositely disposed around the axle in such manner that the lugs on the corresponding sides are adapted to mutually engage in a longitudinal direction. In this way, I secure the well-known advantages of pressed metal construction and completely prevent any relative longitudinal movement of the component members of the axle collar.

I provide also a novel form of threaded construction, wherein an extruded section of the wall of each axle-inclosing member has its central portion pressed out to form a distinct bridging loop. The loop is internally threaded, and the separated adjacent portions of the extruded section are coöperatively threaded on their outer surfaces. In this way, a threaded opening of greater diameter and greater length than the thickness of the material and adapted for inclosing a positioning member, as a bolt of ordinary construction, is provided.

In the accompanying drawing, Figure 1 is a view in plan, with parts broken away for clearness, of an axle collar constructed in accordance with my invention and assembled in position on a locomotive truck. Fig. 2 is a view, in end elevation, with parts broken away, of the axle collar and shaft shown in Fig. 1, and Fig. 3 is a detail view showing a certain portion of the device of Fig. 1.

Referring to the drawings, the apparatus here shown comprises a shaft 1 of a car or locomotive truck, a wheel 3, a portion only being shown, and an axle collar 2 constructed in accordance with my invention and one end of which fits over an axle brass 4 of a dynamo-electric machine (not shown).

The collar 2 comprises two similar members which are disposed around the shaft 1 and are clamped together by suitable bolts 5, as hereinafter described. Each of the component members of the collar is provided, at its respective sides, with extruded portions or lugs 6 which are staggered relative to each other. The members are oppositely assembled on the axle 1 in such manner that the lugs 6 on their corresponding sides are adapted to engage each other in a longitudinal direction.

The mutually engaging lugs 6 are complementary in nature and are adapted to nest within one another, as clearly shown in Fig. 1, thereby completely preventing any relative longitudinal movement of the collar members in one direction on one side of the collar, and in the opposite direction on the other side.

The extruded portions 6 are continued in each direction to form, near each end of the collar, a pair of projecting ledges 7 through which the clamping bolts 5 extend.

The collar 2 may be moved longitudinally, as a whole, by means of positioning bolts 8 which are located on opposite sides of the collar and are threaded through extruded sections 9 of novel construction. Each section has an intermediate portion of its wall pressed out to form a distinct bridging loop 10, which is internally threaded. The adjacent separated portions of the section are coöperatively threaded on their outer surfaces, thereby forming a suitable threaded opening for the bolt 8. The heads of the bolts are disposed in stationary contact with the structure of the wheel 3, and, in this way, the collar is suitably held in position with respect to the axle brass 4.

Various modifications in the device herein described may be effected within the spirit and scope of my invention, and I desire that only such limitations shall be imposed as are indicated in the appended claims.

I claim as my invention:

1. An axle collar comprising a plurality of duplicate interfitting members having engaging portions on their respective sides in staggered relation.

2. An axle collar comprising a plurality of duplicate axle-inclosing members having mutually interlocking portions on their respective sides in staggered relation.

3. An axle collar comprising a plurality of identical axle-inclosing members severally having staggered lugs on their respective sides, the said members being assembled to cause the lugs on the corresponding sides to engage each other in a longitudinal direction.

4. An axle collar comprising a plurality of identical axle-inclosing members severally having staggered lugs adapted to oppositely engage longitudinally on the corresponding sides.

5. An axle collar comprising a pair of axle-inclosing members severally having staggered lugs adapted to engage on one side of the collar to prevent relative longitudinal movement of the members in one direction and on the opposite side to prevent such movement in the opposite direction.

6. A pressed steel axle collar comprising a plurality of identical axle-inclosing members severally having staggered extruded lugs on the respective sides, the said members being assembled to cause the lugs on the corresponding sides to engage in a longitudinal direction.

7. A pressed steel axle collar comprising a plurality of identical axle-inclosing members severally having staggered extruded lugs adapted to oppositely engage longitudinally on the corresponding sides.

8. A pressed-steel axle collar comprising a pair of axle-inclosing members severally having staggered extruded lugs adapted to engage on one side of the collar to prevent relative longitudinal movement of the member in one direction and on the opposite side to prevent such movement in the opposite direction.

9. A spacing member having a threaded opening of greater diameter and greater length than the thickness of the member.

10. A spacing member having a threaded portion of greater diameter and greater length than the thickness of the member and adapted to inclose a positioning member.

11. A hollow spacing member having threads cut in a portion of its external surface and coöperating threads cut in a portion of its internal surface.

12. An axle-inclosing member having threads cut in a portion of its external surface and coöperating threads cut in a portion of its internal surface.

13. An axle-inclosing member having threads cut in a portion of its external surface and provided with an expanded portion projecting beyond the said external surface, the said expanded portion being internally threaded.

14. A spacing member having a plurality of side-by-side portions certain of which are threaded to engage a certain peripheral portion of a threaded member and another of which is coöperatively threaded to engage a different peripheral portion of the threaded member.

15. A hollow spacing member having threads cut in a portion of its external surface and provided with an intermediate projecting portion having coöperating threads cut in its internal surface.

16. A spacing member having threads cut in its outer surface and provided with an intermediate integral bridging loop having coöperating threads cut in its adjacent inner surface.

17. An axle-incasing member having an integral portion of one wall adapted to form a bridging loop and having the inner surface of the loop and the adjacent separated portions of the outer surface of the wall coöperatively threaded.

18. A pressed steel spacing member having threads cut in its outer surface and provided with an intermediate extruded bridging member having coöperating threads cut in its adjacent inner surface.

19. A pressed-steel axle-incasing member having an integral portion of one wall extruded to form a bridging loop and having the adjacent separated portions of the outer surface of the loop and the adjacent separated portions of the outer surface of the wall coöperatively threaded.

20. A pressed-steel axle-incasing member having an extruded section, the intermediate portion of which forms a distinct bridging loop, the loop being threaded internally and the separated adjacent portions of said section being coöperatively threaded.

21. An axle collar comprising two duplicate, oppositely-assembled members provided on opposite sides with mutually-nesting lugs and with bolt-receiving ledges respectively forming continuations of said lugs.

22. A pressed-metal axle collar comprising two duplicate, oppositely-assembled members provided on opposite sides with mutually-nesting extruded lugs disposed near the center of the collar and with extruded bolt-receiving ledges respectively forming continuations of said lugs.

In testimony whereof, I have hereunto subscribed my name this 13th day of Feb., 1914.

GEORGE M. EATON.

Witnesses:
G. R. GWINN,
B. B. HINES.